United States Patent [19]

Imperiale

[11] 4,256,090
[45] Mar. 17, 1981

[54] SOLAR HEATING SYSTEM

[76] Inventor: Alessandro Imperiale, 42 Nostrand Ave., Brentwood, N.Y. 11717

[21] Appl. No.: 80,514

[22] Filed: Oct. 1, 1979

[51] Int. Cl.³ .............................................. F24J 3/02
[52] U.S. Cl. .................................... 126/427; 126/437
[58] Field of Search ............... 126/416, 427, 437, 422; 165/DIG. 2; 237/8 R; 122/20 B

[56] References Cited

U.S. PATENT DOCUMENTS

| 705,167 | 7/1902 | Walker | 126/427 |
|---|---|---|---|
| 3,299,881 | 1/1967 | Koch | 126/416 |
| 4,196,718 | 4/1980 | Neustein | 126/416 |

FOREIGN PATENT DOCUMENTS

| 2727593 | 1/1979 | Fed. Rep. of Germany | 126/427 |
|---|---|---|---|
| 2901690 | 10/1979 | Fed. Rep. of Germany | 126/427 |
| 52-3739 | 1/1977 | Japan | 126/427 |

Primary Examiner—James C. Yeung
Attorney, Agent, or Firm—James P. Malone

[57] ABSTRACT

A solar heating system adapted to be installed in a chimney. A solar tank is mounted on top of the chimney. A translucent dome covers the top of the solar tank. An outer pipe extends down from the solar tank through the chimney. A heating tank is located at the lower end of the chimney, the outer pipe extending down to the heating tank. An inner pipe is coaxially mounted in the outer pipe and extends from the heater tank up to the solar tank.

2 Claims, 3 Drawing Figures

SOLAR HEATING SYSTEM

This invention relates to solar heating systems, and more particularly to a solar heater adapted to be mounted on an existing chimney.

BACKGROUND OF THE INVENTION

Due to the energy shortage it is desirable that efficiency of heating hot water be maximized. Various solar systems have been proposed. However, the present invention has new and improved features not shown by the prior art.

THE PRESENT INVENTION

The present invention incorporates a solar heating device which is adapted to be connected to an existing heating system. The present invention is a combined system using a heater plus the additional energy received from the sun.

More specifically, the present invention is a solar heating device adapted to be installed in a chimney, a solar tank is mounted on top of the chimney, a translucent dome covers the top of the solar tank, an outer pipe extends down from the solar tank through the chimney, a heating tank is located at the lower end of the chimney, the outer pipe extending down to the heating tank, an inner pipe is coaxially mounted in the outer pipe and extends from the heater tank up to the solar tank.

With the present invention, the energy derived from the sun is used to maximum advantage. On a sunny day, less heating fuel will be required. On a cloudy day, more heating fuel will be required.

Accordingly, a principal object of the invention is to provide new and improved solar heating means.

Another object of the invention is to provide new and improved heating means incorporating a combination of conventional heating and solar heating.

Another object of the invention is to provide new and improved solar heating system adapted to be installed in a chimney comprising, a solar tank mounted on top of a chimney, a translucent dome covering the top of the solar tank, an outer pipe extending down from the solar tank through the chimney, a heating tank at the lower end of the chimney, the outer pipe extending down to the heating tank, an inner pipe coaxially mounted in the outer pipe and extending from the heater tank up to the solar tank, means connected to admit cold water to the heater tank, and means connected to the outer pipe to discharge hot water.

These and other objects of the invention will be apparent from the following specification and drawing.

DESCRIPTION OF THE PREFERRED EMBODIMENT

Figure 1:
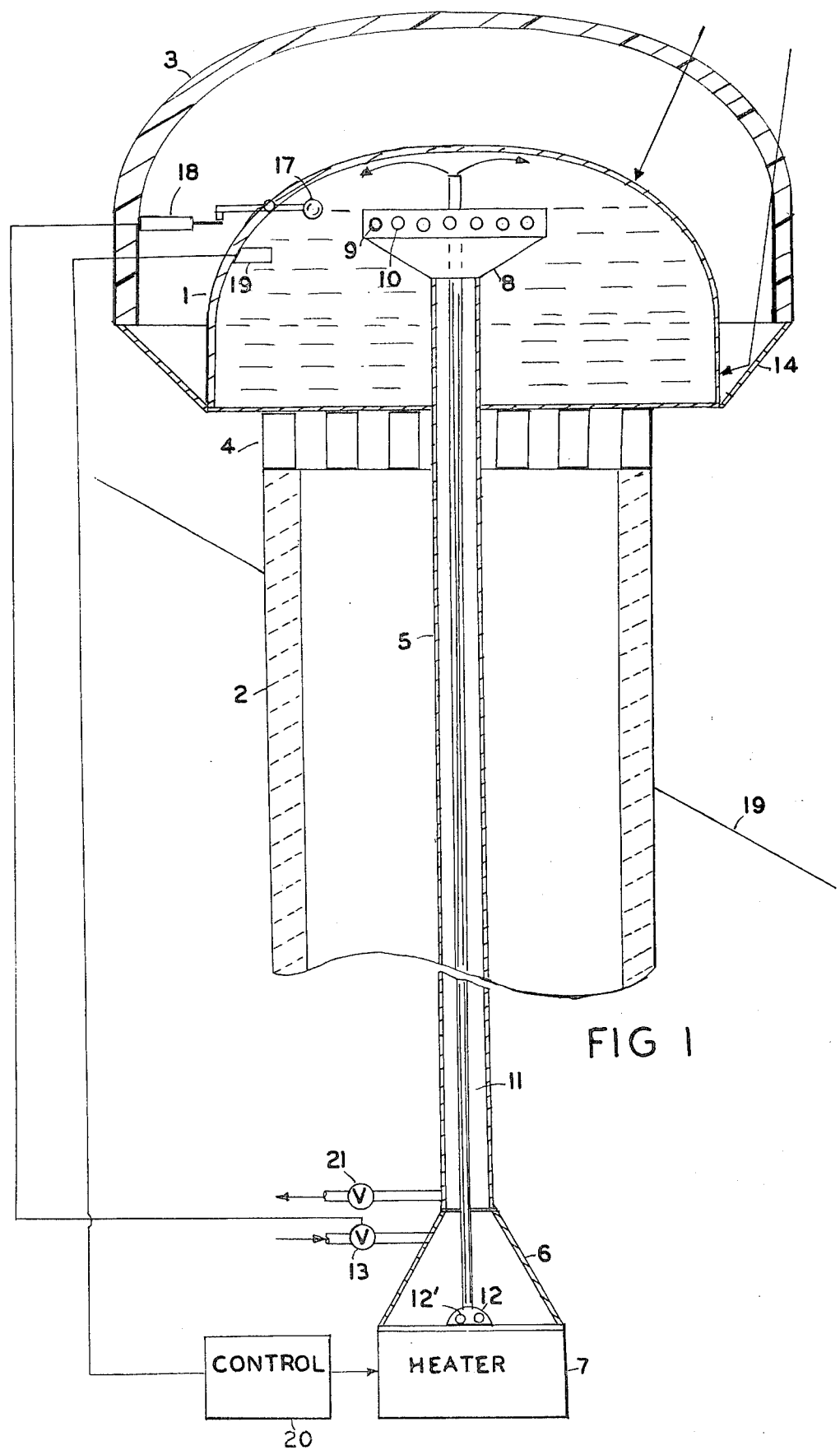
FIG. 1 is a side view of an embodiment of the invention partly in section.

Referring to the drawings, the invention comprises a tank 1, which is adapted to be mounted on an existing chimney 2, extending above the roof 19. A translucent dome 3, covers the tank 1, for the purpose of admitting the sun's rays to add heat to the water in the tank 1. The tank 1, is mounted on an open foundation 4, mounted on top of the chimney, which may be made of open brick work. The tank 1 is surrounded by reflector 14 to reflect the sun's rays onto the tank 1. The tank 1 may extend one or two feet beyond the edges of the chimney. The mounting of the solar tank may be reinforced in conventional manner with clamps, guy wires, etc.

The outer pipe 5 extends down from the upper solar tank 1, to a lower heating tank 6. The water in the lower heater tank is adapted to be heated by conventional heater 7, which may be an oil or gas burner. At the upper end of the pipe 5 is a cone 8, having a plurality of apertures 9, 10, etc., which permits water from the tank to flow down the outer pipe 5.

The inner pipe 11 has a cup shaped member 12 mounted on its lower end in contact with the heater 7, the cup 12 has apertures 12'. The upper end of the inner pipe 11, extends above the cone 8 so that hot water rising in the inner pipe 11, will spray out into the tank 1. The water rises in the inner pipe similarly to the action of a coffee percolator. The system may be adjusted so that water is heated by the heater 7, to a certain temperature, for instance 160° F. and then it is heated to a higher tempertture, by the sun's rays passing through the translucent dome 3. The translucent dome 3 may be made of glass or plastic of a composition which will permit maximum passage of the sun's rays through it.

A source of cold water is connected to the tank 6 through the valve 13. Hot water is taken out of the system through the valve 21, which is connected to the outer pipe 5.

In operation, cold water is admitted to the tank 6 and heated by the heater 7 so that it rises up into the tank 1, where it is additionally heated by the sun's rays. The hot gases rising through the chimney will provide additional heat to the tank 1. The heated water from the tank 1, will flow through the apertures 9, 10, etc., in the cone 8 and pass down through the outer pipe 5 through the valve 14 to the existing hot water and heating system.

Figure 2:
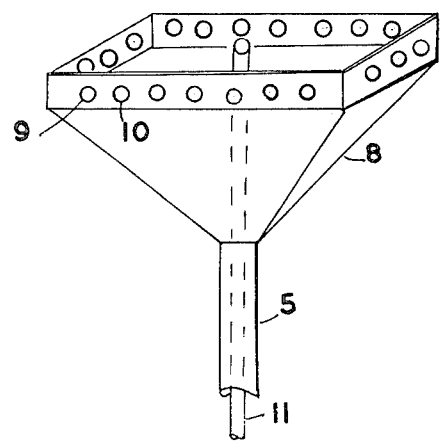

FIG. 2 shows a perspective view of cone like member 8.

Figure 3:
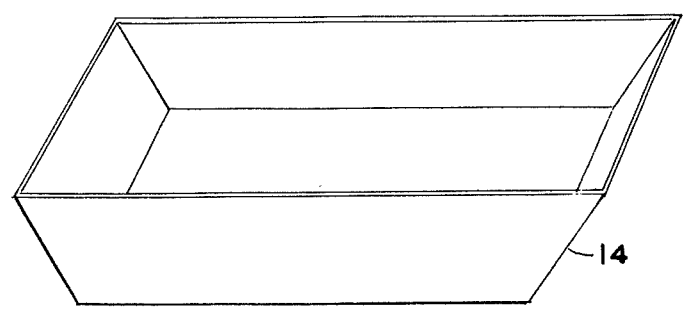
FIGS. 2 and 3 are perspective views of the embodiment of FIG. 1.

FIG. 3 shows a perspective view of tank 1 and reflector 14.

The system may be made substantially fully automatic by adding the water level sensor 17 which operates a micro switch 18 which controls the valve 13 to control the amount of cold water admitted to the system.

A thermostat 19 may also be added to sense the water temperature in the upper tank 1. The thermostat 18 is connected in conventional manner to a conventional heater control 20 to turn on the heater 7, if the water falls below a certain temperature, for instance, 160° F. and to turn off the heater 7, if the water exceeds the certain temperature, for instance, 180° F. or 200° F.

If desired, a storage tank may be incorporated in the system to store heat during sunny days and give up heat during cloudy days.

Therefore, the present invention provides a new and improved system which is relatively inexpensive and easy to install in an existing heating system.

The present system will make maximum use from solar energy and save on fuel bills.

It is claimed:

1. A solar heating system adapted to be installed in a chimney comprising:
   an open base mounted on top of the chimney,
   a solar tank mounted on the open base,
   a translucent dome covering the top of the solar tank, an outer pipe extending down from the solar tank through the chimney, a heating tank at the lower end of the chimney, the outer pipe extending down to the heating tank, an inner pipe coaxially mounted in the outer pipe and extending from the heater tank up to the solar tank, means connected to admit cold water to the heater tank, and means connected to the outer pipe to discharge hot water.

2. Apparatus as in claim 1 having a dish connected to the bottom end of the inner pipe, the inner pipe and the dish causing the heated water to rise in the inner pipe.

* * * * *